(12) United States Patent
Keppy et al.

(10) Patent No.: US 10,215,144 B1
(45) Date of Patent: Feb. 26, 2019

(54) FUEL SYSTEM WITH SWITCHABLE PRESSURE REGULATION

(71) Applicant: Robert Bosch GmbH, Stuttgart (DE)

(72) Inventors: Brent D. Keppy, Waterford, MI (US); Justin Allen, Clarkston, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/730,037

(22) Filed: Oct. 11, 2017

(51) Int. Cl.
*F02M 63/02* (2006.01)
*F02M 55/02* (2006.01)
*F02M 37/00* (2006.01)
*F02D 33/00* (2006.01)

(52) U.S. Cl.
CPC ......... *F02M 63/024* (2013.01); *F02D 33/006* (2013.01); *F02M 37/0029* (2013.01); *F02M 55/02* (2013.01); *F02M 2700/05* (2013.01)

(58) Field of Classification Search
CPC ............ F02M 63/024; F02M 27/0029; F02M 27/0076; F02M 55/02; F02M 2700/05; F02D 33/006
See application file for complete search history.

(56) References Cited

U.S. PATENT DOCUMENTS

| | | | |
|---|---|---|---|
| 5,809,973 A * | 9/1998 | Iida | F02D 41/0087 123/179.16 |
| 6,155,233 A | 12/2000 | Wade et al. | |
| 6,672,279 B2 * | 1/2004 | Nakayama | F01N 3/0231 123/299 |
| 7,398,763 B2 | 7/2008 | Gibson et al. | |
| 7,861,693 B2 | 1/2011 | Einberger et al. | |
| 8,028,676 B2 | 10/2011 | Ancimer et al. | |
| 8,371,107 B2 | 2/2013 | Haeberer et al. | |
| 8,549,842 B2 | 10/2013 | Park | |
| 9,387,437 B2 | 7/2016 | Hogan et al. | |
| 2006/0000452 A1 * | 1/2006 | Tokuda | F02D 33/006 123/456 |
| 2011/0232270 A1 * | 9/2011 | Burkitt | F01N 3/0253 60/286 |
| 2012/0167859 A1 * | 7/2012 | Basmaji | F02D 19/0605 123/456 |
| 2016/0017823 A1 | 1/2016 | Sloan et al. | |
| 2016/0169147 A1 * | 6/2016 | Surnilla | F02D 41/2467 123/299 |
| 2016/0208757 A1 * | 7/2016 | Pursifull | F02M 59/022 |

* cited by examiner

*Primary Examiner* — Lindsay Low
*Assistant Examiner* — George Jin
(74) *Attorney, Agent, or Firm* — Michael Best & Friedrich LLP

(57) ABSTRACT

A fuel system is provided for switching between two separate regulated pressures of a first fuel pump to a supply line. The supply line supplies both a second fuel pump of a high pressure fuel injection system and a fuel injector separate from the high pressure fuel injection system. The switchover can include multiple regulators, one of which is selectively disabled.

20 Claims, 2 Drawing Sheets

FUEL SYSTEM WITH SWITCHABLE PRESSURE REGULATION

BACKGROUND

The present invention relates to fuel systems for internal combustion engines. Such fuel systems, commonly found in passenger cars, light and heavy duty trucks, commercial or construction equipment and the like may have multiple functions or uses, and components must typically be sized or configured to satisfy all modes of operation, even when certain modes are infrequently incurred.

SUMMARY

In one aspect, the invention provides a fuel system for an internal combustion engine. The fuel system includes a fuel tank and a first fuel pump in communication with the fuel tank to draw fuel therefrom. A second fuel pump is in communication with the first fuel pump to receive fuel therefrom. The second pump is operable to supply fuel at a pressure greater than that received from the first fuel pump to a first fuel injection system. A first fuel injector of the first fuel injection system is operably coupled to receive fuel supplied from the fuel tank by the first and second fuel pump. A second fuel injector of a second fuel injection system is operably coupled to receive fuel from the fuel tank by the first fuel pump and not the second fuel pump. A supply line is shared by the second fuel pump and the second fuel injector. A first regulator is operable to regulate fuel pressure from the first fuel pump to the supply line at a first value. A second regulator is operable to regulate fuel pressure from the first fuel pump to the supply line at a second value that is higher than the first value. A controller is programmed to operate the fuel system in a first mode in which the first regulator is enabled to set a fuel pressure in the supply line to the first value, the second regulator is disabled, and the second fuel injector is disabled. The controller is further programmed to operate the fuel system in a second mode in which the second fuel injector is enabled and the second regulator is enabled to set a fuel pressure in the supply line to the second value.

In another aspect, the invention provides fuel system for an internal combustion engine. The fuel system includes a fuel tank and a first fuel pump in communication with the fuel tank to draw fuel therefrom. A second fuel pump is in communication with the first fuel pump to receive fuel therefrom. The second pump is operable to supply fuel at a pressure greater than that received from the first fuel pump to a first fuel injection system. A first fuel injector of the first fuel injection system is operably coupled to receive fuel supplied from the fuel tank by the first and second fuel pumps, the first fuel injector operable to inject fuel into the engine for combustion. A second fuel injector of a second fuel injection system is operably coupled to receive fuel from the fuel tank by the first fuel pump and not the second fuel pump, the second fuel injector operable to inject fuel into an exhaust gas pipe coupled to the engine. A supply line is shared by the second fuel pump and the second fuel injector. A first regulator is operable to regulate fuel pressure from the first fuel pump to the supply line at a first value. A second regulator is operable to regulate fuel pressure from the first fuel pump to the supply line at a second value that is higher than the first value. A switchover valve is operable to switch from a first position in which the first regulator is active to a second position in which the second regulator is active.

In yet another aspect, the invention provides a method of operating a fuel system for an internal combustion engine. Fuel is drawn from a fuel tank by operation of a first fuel pump. Fuel pressure is regulated in a supply line between the first fuel pump and a second fuel pump to a first value in a first mode of operation. The second fuel pump is operated to supply fuel to a first fuel injector of a first fuel injection system at a pressure greater than the first value, the first fuel injector injecting fuel into the engine for combustion. During running of the engine, the fuel system is transitioned to a second mode of operation in which fuel pressure in the supply line is regulated to a second value that is higher than the first. Both the second fuel pump and a second fuel injector of a second fuel injection system are supplied from the supply line during the second mode of operation. The second fuel injector is operated to inject fuel into an exhaust gas pipe coupled to the engine during the second mode of operation. The second fuel pump is operated to supply fuel to the first fuel injector at a pressure greater than the second value during the second mode of operation.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
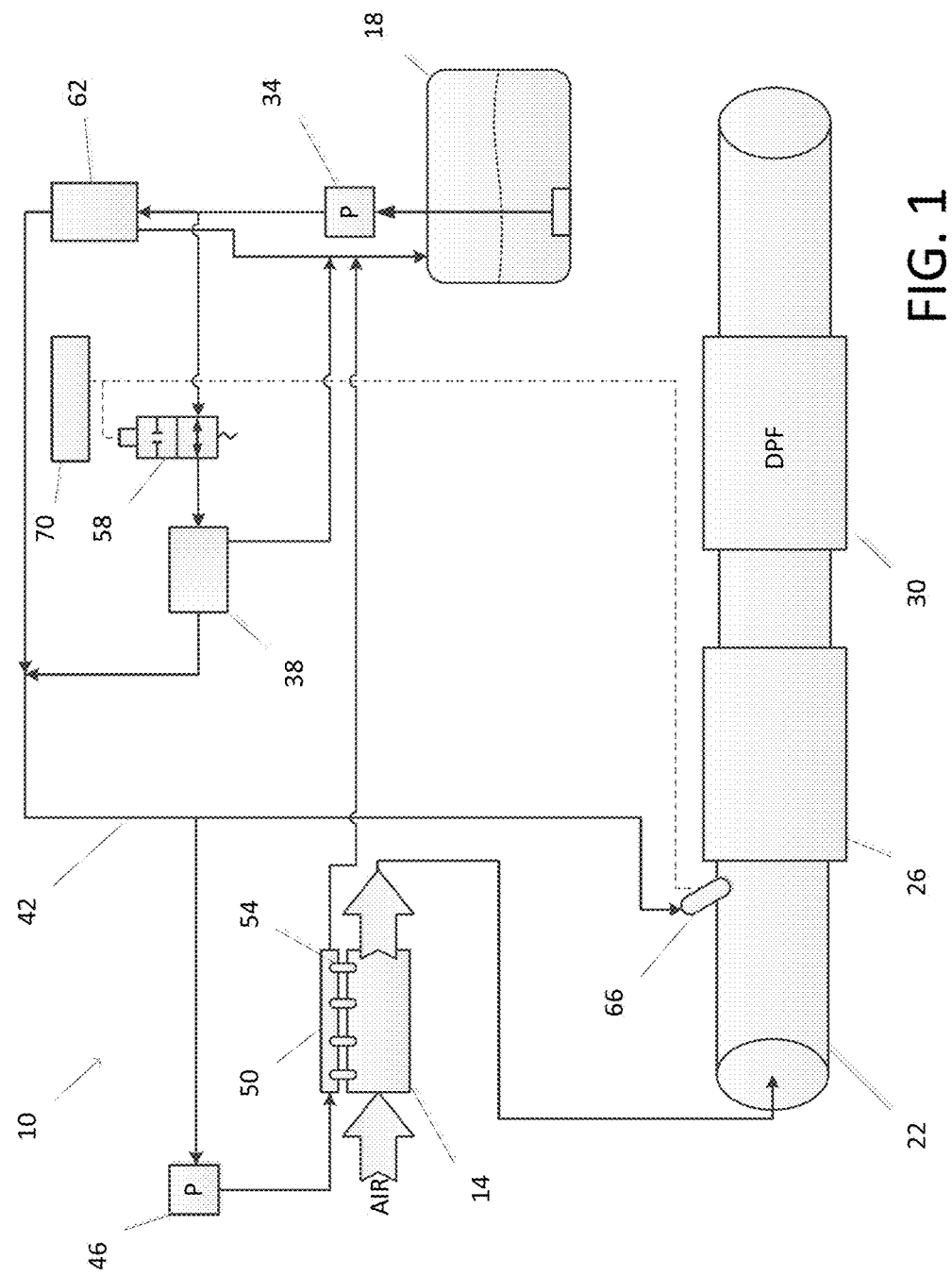
FIG. 1 is a schematic view of a fuel system for an internal combustion engine according to one embodiment of the invention.

A fuel system 10 for an internal combustion engine 14 is shown in FIG. 1. The fuel system 10 includes a fuel tank 18 for storing a quantity of fuel for consumption. As will be appreciated by those of skill in the art, the engine 14 operates by taking in fuel and air, which are combusted within the engine 14 to generate mechanical power. The power can be applied to the drive wheels of a vehicle, among other things. After combustion, byproducts are expelled to an exhaust system prior to being returned to the atmosphere. The exhaust system can include an exhaust pipe 22 having therein one or more treatment elements for treating the byproducts, which can include filtering and/or chemical conversion, for example by catalytic oxidation. In the case of a diesel fuel system for a diesel engine, the exhaust pipe 22 can include a diesel oxidation catalyst 26 and a diesel particulate filter 30. Other exhaust configurations that utilize fluid injection to achieve emissions reduction or catalyst regeneration are also considered.

Although additional modes or functions of the fuel system 10 are discussed in further detail below, the basic operation of fueling the engine 14 is first described. A first fuel pump 34 is provided with an inlet in communication with the fuel tank 18 so that operation of the first fuel pump 34 draws fuel from the fuel tank 18. The first fuel pump 34 can be physically located external to the tank 18 as shown, or internal to the tank 18. From the first fuel pump 34 (or "low pressure fuel pump"), fuel is sent through a first regulator 38 into a supply line 42 that leads into a second fuel pump 46 (or "high pressure fuel pump"). With the two-stage fuel pressurization, fuel is only injected into the engine 14 after pressurization by the second fuel pump 46. Fuel may be pressurized from the second fuel pump 46 to a fuel rail 50 that supplies one or more fuel injectors 54. Although FIG. 1 illustrates the pumps 34, 46 as two separate parts, and this may be illustrative of one physical construction, both of the pumps 34, 46 may be designed to package within one overall pump housing in other constructions. The fuel injectors 54 are operable to spray fuel directly into corresponding combustion chambers of the engine 14. The fuel pressure in the rail 50 can be maintained at or above 250 bar by the second fuel pump 46, and in some cases can reach 2000 bar and more. The first fuel injector 54, or the group thereof, supplied by the second fuel pump 46 constitutes a first fuel injection system of the fuel system 10.

With reference to the right side of FIG. 1, it can be seen that fuel from the first fuel pump 34 is directed through a valve 58 in line with the first regulator 38. The valve 58 can be a normally open solenoid-actuated two-position valve, referred to herein as a "switchover" valve for reasons that will become apparent. The switchover valve 58 can have a fast-latch, slow-unlatch behavior. In the illustrated construction, the switchover valve 58 is positioned on an upstream side of the first regulator 38. Note that the switchover valve 58 can alternatively be positioned on the downstream side of the first regulator 38 in another construction. The fuel line having the first regulator 38 and the switchover valve 58 is one of two parallel lines between the first fuel pump 34 and the supply line 42. The second line between the first fuel pump 34 and the supply line 42 includes a second regulator 62. The second regulator 62 is operable to regulate fuel pressure to a higher value than a pressure regulated by the first regulator 38. Thus, when the valve 58 is left open, the first regulator 38 is active to open and return fuel to the tank 18, and pressure in the supply line 42 is regulated to the value set by the first regulator 38. Because the set pressure of the first regulator 38 is lower than that of the second regulator 62, the second regulator 62 simply remains closed despite being in fluid communication with the outlet side of the first fuel pump 34. The second regulator 62 may be set to supply fuel at a pressure at least two times that of the first regulator 38. In one example, given for illustrative purposes, the first regulator 38 may be set to supply fuel at 4 bar, and the second regulator 62 may be set to supply fuel at 10 bar. In another example, the first regulator 38 may be set to supply fuel at 3 bar, and the second regulator 62 may be set to supply fuel at 6 bar.

The second regulator 62 is provided for use in a second mode of operating the fuel system 10, for supplying a second fuel injection system including at least one fuel injector 66 that is not part of the first fuel injection system. In other words, the fuel injector 66 is not supplied by the second fuel pump 46, and in the illustrated example is not configured to supply fuel for combustion within the engine 14. Rather, the additional fuel injector 66 is operable to deliver fuel into the exhaust pipe 22. For example, the fuel injector 66 can be operated at designated times to deliver fuel into the exhaust pipe 22 upstream of the diesel particulate filter 30 to perform a so-called diesel particulate filter regeneration, which involves burning off soot collected within the diesel particulate filter 30. As illustrated, the fuel injector 66 is also positioned upstream of the oxidation catalyst 26, however placement of the fuel injector 66 can take a variety of alternate layouts, including being incorporated into a portion of the exhaust pipe 22 defining either of the oxidation catalyst 26 or the particulate filter 30. The fuel injector 66 can be either electrically actuated, or a spring-biased device that relies on fuel supply pressure to overcome the spring force and open the fuel injector 66 for fuel delivery. Proper performance of the fuel injector 66 may depend on a supply of fuel at a pressure higher than that provided by the first regulator 38, though still within the capability of the first fuel pump 34. Since regenerating the diesel particulate filter 30 is not an event that occurs continuously during running of the engine 14, but only a small minority of the time (e.g., 5 percent or less), the fuel injection system having the fuel injector 66 is likewise limited to intermittent use during a minority of the time that the engine 14 operates with the first fuel injection system. Although it is possible to set the first regulator 38 to provide a fuel pressure that will satisfy the needs of both the first and second fuel injections systems, the majority of the duration of engine operation (i.e., all times other than diesel particulate filter regeneration) leads to excess energy consumption by running the low-pressure side of the fuel system 10 (i.e., between the first and second fuel pumps 34, 46) at a pressure that is higher than the minimum pressure needed for the second fuel pump 46.

To avoid such drawbacks, the fuel system 10 is configured to switch between the first and second fuel pressure regulators 38, 62 according to the enabled/disabled state of the second fuel injection system having the fuel injector 66. For example, the fuel system 10 is under the control of a controller 70 that is programmed to control the position of the switchover valve 58 in accordance with the starting and stopping of a diesel particulate filter regeneration cycle. As indicated by the dashed lines in FIG. 1, the controller 70 is in electrical signal communication with both the fuel injector 66 and the switchover valve 58, and the controller 70 can be the controller 70 programmed to execute actuation of the fuel injector 66. During running of the engine 14, the controller 70 identifies a time to begin a diesel particulate filter regeneration (e.g., according to one or more sensor outputs or a predictive algorithm that tracks engine operating conditions). The controller 70 then transitions the fuel system 10 into the second mode of operation by actuating the switchover valve 58 and enabling the fuel injector 66. The control of the switchover valve 58 and the fuel injector 66 can be independent from each other, or in conjunction—simplifying the overall system. By actuating the switchover valve 58 to close, fuel from the first fuel pump 34 is forced to take the path to the supply line 42 that has the second regulator 62 therein. With the first regulator 38 effectively cut out of the circuit, fuel is provided by the first fuel pump 34 to the supply line 42 as regulated to the value set by the second regulator 62, which is higher than that of the first regulator 38. Although the fuel pressure at the supply line 42 is excessive with respect to what is required as a designated minimum inlet pressure by the second fuel pump 46, the increase is momentary and limited to the operation of the fuel injector 66 to perform the diesel particulate filter regeneration. Once the regeneration is completed, the controller 70 is programmed to transition the fuel system 10 back to the first mode of operation by disabling the fuel injector 66 and returning the switchover valve 58 to the first position in which a connection path is established between the first fuel pump 34 and the supply line 42 through the first regulator 38. This effectively prevents the second regulator 62 from operating, and the supply line fuel pressure is set to the value of the first regulator 38, which is lower than that of the second regulator 62. Normal running of the engine 14 continues by operation of the first fuel injection system having fuel injectors 54, without operation of the second fuel injection system having fuel injector 66. The low-pressure side of the fuel system 10 is maintained at a pressure that satisfies the minimum requirement of the second fuel pump 46, but not the minimum requirement of the second fuel injector 66.

Figure 2:
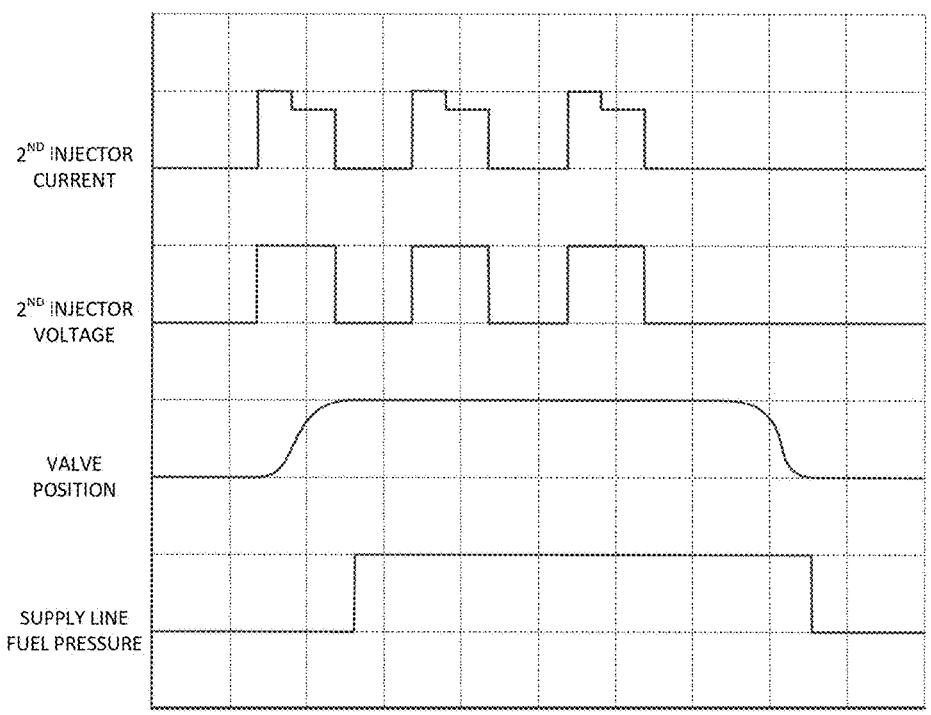
FIG. 2 is a graph illustrating overlying plots of injector-controlling current and voltage along with switchover valve position and supply line pressure according to one aspect of the invention.

FIG. 2 is a graph showing a number of parameters plotted on the vertical axis against a common time parameter on the horizontal axis. In describing the graph, it is first noted that the electrical circuit for driving the switchover valve 58 can be implemented as a simple circuit wired in parallel with the driver circuit from the controller 70 to the second fuel injector 66 so that the driver or command signal (e.g., characteristic voltage, current) from the controller 70 to the second fuel injector 66 is also applied to the switchover valve 58, rather than an independent control signal output and electrical circuit from the controller 70. Because the controller output for the second fuel injector 66 is already present in a system having such an injector, the addition of the switchover valve 58 to carry out the supply line pressure switching has a minimal impact on system cost and complexity for implementation. As shown in FIG. 2, the driver circuit for the second fuel injector 66 can consist of a fixed-frequency, variable pulse width voltage supply (e.g., 12v). The corresponding current pulses follow the same general form, though exhibiting within each pulse a current reduction after a momentary peak, corresponding to the initial effort to open the second fuel injector 66 followed by a lower effort required to hold it open. The switchover valve 58 is tuned to be actuated by the duty cycle for the second fuel injector 66 such that when the pulsed signal begins, the switchover valve 58 begins to actuate (e.g., toward the closed position). Once the switchover valve 58 reaches the closed position, the supply line pressure is no longer regulated to the first, lower value of the first regulator 38, but rather the second, higher value of the second regulator 62. The supply line 42 remains at the second, higher pressure value as long as the command signal continues to the second fuel injector 66. Only in the absence of the command signal does the switchover valve 58 cease actuation and begin to return to its normally biased position (e.g., open). Once open, the switchover valve 58 brings the lower pressure first regulator 38 back into the loop so that the supply line pressure returns to the lower pressure value and the second regulator 62 is accordingly disabled. The opening characteristic of the switchover valve 58 is slow enough to ensure that the switchover valve 58 remains closed and the higher supply line pressure provided by the second regulator 62 is maintained throughout the end of the active operation of the second fuel injector 66.

Various features and advantages of the invention are set forth in the following claims.

What is claimed is:

1. A fuel system for an internal combustion engine comprising:
    a fuel tank;
    a first fuel pump in communication with the fuel tank to draw fuel therefrom;
    a second fuel pump in communication with the first fuel pump to receive fuel therefrom, the second pump being operable to supply fuel at a pressure greater than that received from the first fuel pump to a first fuel injection system;
    a first fuel injector of the first fuel injection system operably coupled to receive fuel supplied from the fuel tank by the first and second fuel pump;
    a second fuel injector of a second fuel injection system operably coupled to receive fuel from the fuel tank by the first fuel pump and not the second fuel pump;
    a supply line shared by the second fuel pump and the second fuel injector;
    a first regulator operable to regulate fuel pressure from the first fuel pump to the supply line at a first value;
    a second regulator operable to regulate fuel pressure from the first fuel pump to the supply line at a second value that is higher than the first value; and
    a controller programmed to operate the fuel system in a first mode in which the first regulator is enabled to set a fuel pressure in the supply line to the first value, the second regulator is disabled, and the second fuel injector is disabled,
    wherein the controller is programmed to operate the fuel system in a second mode in which the second fuel injector is enabled and the second regulator is enabled to set a fuel pressure in the supply line to the second value.

2. The fuel system of claim 1, further comprising a switchover valve operable to switch from a first position to a second position to enable the second regulator.

3. The fuel system of claim 2, wherein the switchover valve is a normally open valve positioned in series with the first regulator and in parallel with the second regulator so that the second regulator remains closed until the switchover valve is actuated to the second position.

4. The fuel system of claim 2, wherein the controller is programmed to command an initialization of the second fuel injector during running of the engine, wherein the controller is programmed to change the switchover valve from the first position to the second position at the initialization of the second fuel injector.

5. The fuel system of claim 4, wherein the controller is programmed to return the switchover valve to the first position upon ending operation of the second fuel injector so that the supply line is only charged to the higher second value during a period of operation of the second fuel injector.

6. The fuel system of claim 1, wherein the second fuel injector is positioned to inject fuel into an exhaust pipe upstream of a diesel particulate filter, and the controller is programmed to operate the second fuel injector only intermittently for regeneration of the diesel particulate filter.

7. The fuel system of claim 1, wherein the first fuel injection system is a common rail diesel direct injection system including a fuel rail operable to receive fuel pressurized by the second fuel pump to a rail pressure.

8. The fuel system of claim 7, wherein the second fuel pump is operable to maintain the rail pressure at or above 250 bar.

9. The fuel system of claim 1, wherein the second value of fuel pressure provided by the second regulator is at least two times the first value of fuel pressure provided by the first regulator.

10. A fuel system for an internal combustion engine comprising:
    a fuel tank;
    a first fuel pump in communication with the fuel tank to draw fuel therefrom;
    a second fuel pump in communication with the first fuel pump to receive fuel therefrom, the second pump being operable to supply fuel at a pressure greater than that received from the first fuel pump to a first fuel injection system;

a first fuel injector of the first fuel injection system operably coupled to receive fuel supplied from the fuel tank by the first and second fuel pumps, the first fuel injector operable to inject fuel into the engine for combustion;

a second fuel injector of a second fuel injection system operably coupled to receive fuel from the fuel tank by the first fuel pump and not the second fuel pump, the second fuel injector operable to inject fuel into an exhaust gas pipe coupled to the engine;

a supply line shared by the second fuel pump and the second fuel injector;

a first regulator operable to regulate fuel pressure from the first fuel pump to the supply line at a first value;

a second regulator operable to regulate fuel pressure from the first fuel pump to the supply line at a second value that is higher than the first value; and a switchover valve operable to switch from a first position in which the first regulator is active to a second position in which the second regulator is active.

11. The fuel system of claim 10, further comprising a controller programmed to command an initialization of the second fuel injector to inject fuel into the exhaust gas pipe during running of the engine, wherein the controller is programmed to change the switchover valve from the first position to the second position at the initialization of the second fuel injector.

12. The fuel system of claim 11, wherein the controller is programmed to return the switchover valve to the first position upon ending operation of the second fuel injector so that the supply line is only charged to the higher second value during a period of operation of the second fuel injector.

13. The fuel system of claim 11, wherein the second fuel injector is positioned upstream of a diesel particulate filter, and the controller is programmed to operate the second fuel injector only intermittently for regeneration of the diesel particulate filter.

14. The fuel system of claim 10, wherein the switchover valve is a normally open valve positioned in series with the first regulator and in parallel with the second regulator so that the second regulator remains closed until the switchover valve is actuated to the second position.

15. The fuel system of claim 10, wherein the first fuel injection system is a common rail diesel direct injection system including a fuel rail operable to receive fuel pressurized by the second fuel pump to a rail pressure.

16. The fuel system of claim 15, wherein the second fuel pump is operable to maintain the rail pressure at or above 250 bar.

17. The fuel system of claim 10, wherein the second value of fuel pressure provided by the second regulator is at least two times the first value of fuel pressure provided by the first regulator.

18. A method of operating a fuel system for an internal combustion engine, the method comprising:

drawing fuel from a fuel tank by operation of a first fuel pump;

regulating fuel pressure in a supply line between the first fuel pump and a second fuel pump to a first value in a first mode of operation;

operating the second fuel pump to supply fuel to a first fuel injector of a first fuel injection system at a pressure greater than the first value, the first fuel injector injecting fuel into the engine for combustion;

transitioning during running of the engine to a second mode of operation in which fuel pressure in the supply line is regulated to a second value that is higher than the first;

supplying both the second fuel pump and a second fuel injector of a second fuel injection system from the supply line during the second mode of operation;

operating the second fuel injector to inject fuel into an exhaust gas pipe coupled to the engine during the second mode of operation; and operating the second fuel pump to supply fuel to the first fuel injector at a pressure greater than the second value during the second mode of operation.

19. The method of claim 18, wherein supply line fuel pressure is regulated to the first value by a first regulator, and wherein transitioning to the second mode of operation to regulate the supply line fuel pressure to the second value includes enabling a second regulator by operating a switchover valve.

20. The method of claim 18, wherein the second mode of operation is a diesel particulate filter regeneration mode activated by the fuel from the second fuel injector, the method further comprising transitioning back to the first mode of operation in which the supply line fuel pressure is regulated to the first value upon completion of the regeneration of the diesel particulate filter.

* * * * *